United States Patent
Suh (10) Patent No.: US 6,907,750 B2
(45) Date of Patent: Jun. 21, 2005

(54) COSMETIC CONTAINER HAVING A COOLING DEVICE

(75) Inventor: Won-Gil Suh, Seoul (KR)

(73) Assignee: Icetec, Inc., Seoul (KR)

(*) Notice: Subject to any disclaimer, the term of this patent is extended or adjusted under 35 U.S.C. 154(b) by 0 days.

(21) Appl. No.: 10/845,054

(22) Filed: May 13, 2004

(65) Prior Publication Data

US 2005/0005628 A1 Jan. 13, 2005

(30) Foreign Application Priority Data

May 15, 2003 (KR) .................................. 10-2003-0030770

(51) Int. Cl.[7] .............................................. F25D 3/08
(52) U.S. Cl. ............................................ 62/371; 62/60
(58) Field of Search ......................... 62/60, 371, 457.1, 62/457.9

(56) References Cited

U.S. PATENT DOCUMENTS 3,636,726 A * 1/1972 Rosenfeld et al. ............ 62/294
4,921,366 A * 5/1990 Hurrell ....................... 401/126

* cited by examiner

Primary Examiner—Melvin Jones
(74) Attorney, Agent, or Firm—Christensen O'Connor Johnson Kindness PLLC (57) ABSTRACT

The cosmetics container includes: a cosmetics case; a refrigerant case; a container for containing the cosmetics case and the refrigerant case; a cosmetics cooling device having a cosmetics cooling tube for cooling cosmetics discharged from the cosmetics case flowing therein and a refrigerant channel for cooling and discharging out the cosmetics contained in the cosmetics cooling tube by evaporating refrigerant discharged from the refrigerant case while the refrigerant flows to a portion of the cosmetics cooling tube and surrounds the cosmetics cooling tube, the cosmetics cooling tube being made of a metallic material and located in the cosmetics cooling device; and a cap containing the cosmetics cooling device therein and having a cosmetics outlet for discharging out the cooled cosmetics, the cap being moved vertically for discharging out the cosmetics and the refrigerant by a pressing action.

4 Claims, 8 Drawing Sheets

COSMETIC CONTAINER HAVING A COOLING DEVICE

BACKGROUND OF THE INVENTION

1. Field of the Invention

The present invention relates to a cosmetics container having a cooling device, and more particularly, to a cosmetics container having a cooling device, which can cool and discharge cosmetics as much as once needed amount by pressing a cap of the cosmetic container.

2. Description of the Related Art

Since a user feels refreshed when using cooled cosmetics, recently, the user uses a refrigerator for cosmetics use, but the user cannot use it during traveling, as the cosmetics refrigerator is not portable.

Korean patent Application No. 10-2003-0001253 discloses a cosmetics container capable of cooling and discharging cosmetics as much as once needed amount using refrigerant such as butane or Freon. The cosmetics container is portable, but is somewhat complicated in use and deteriorated in cooling efficiency.

SUMMARY OF THE INVENTION

In view of the foregoing, it is an object of the present invention to provide a cosmetics container having a cooling device, which is easy in manipulation and provides excellent cooling efficiency everywhere, and which can cool and discharge cosmetics as much as once needed amount.

In order to achieve the above object, the present invention provides a cosmetics container having a cooling device comprising: a cosmetics case; a refrigerant case; a container for containing the cosmetics case and the refrigerant case; a cosmetics cooling device having a cosmetics cooling tube for cooling cosmetics discharged from the cosmetics case flowing therein and a refrigerant channel for cooling and discharging out the cosmetics contained in the cosmetics cooling tube by evaporating refrigerant discharged from the refrigerant case while the refrigerant flows to a portion of the cosmetics cooling tube and surrounds the cosmetics cooling tube, the cosmetics cooling tube being made of a metallic material and located in the cosmetics cooling device; and a cap containing the cosmetics cooling device therein and having a cosmetics outlet for discharging out the cooled cosmetics, the cap being moved vertically for discharging out the cosmetics and the refrigerant by a pressing action.

When a user presses the cap, the refrigerant and the cosmetics of predetermined amounts are simultaneously flown from the cases to the cosmetics cooling device, the refrigerant is evaporated while surrounding and flowing around the outer surface of the cooling tube and cooling the cosmetics, which flows inside the cooling tube, and discharged to a refrigerant outlet, and the cosmetics are cooled while flowing inside the cooling tube and discharged to the cosmetics outlet. As a result, the cosmetics and the refrigerant carry out heat exchange by means of the cooling tube located between the cosmetics and the refrigerant, and the cosmetics are cooled due to evaporated heat of the refrigerant since the outer wall of a tube in which the refrigerant flows is heat-insulated from the outside.

For the heat exchange between the cosmetics and the refrigerant, there are two cooling methods: one being a co-current cooling method of cooling the cosmetics while the refrigerant flows in the same direction as the cosmetics; and the other being a counter-current cooling method of cooling the cosmetics while the refrigerant flows in the opposite direction to the cosmetics. The counter-current cooling method is more effective as the cosmetics meet the refrigerant of the lowest temperature just before the cosmetics are discharged out when the refrigerant flows in the opposite direction to the cosmetics flowing inside the cooling tube.

BRIEF DESCRIPTION OF THE DRAWINGS

The nature and mode of operation of preferred embodiments of the present invention will now be more fully described in the following detailed description, taken with the accompanying drawings wherein.

DETAILED DESCRIPTION OF THE INVENTION

Figure 1:
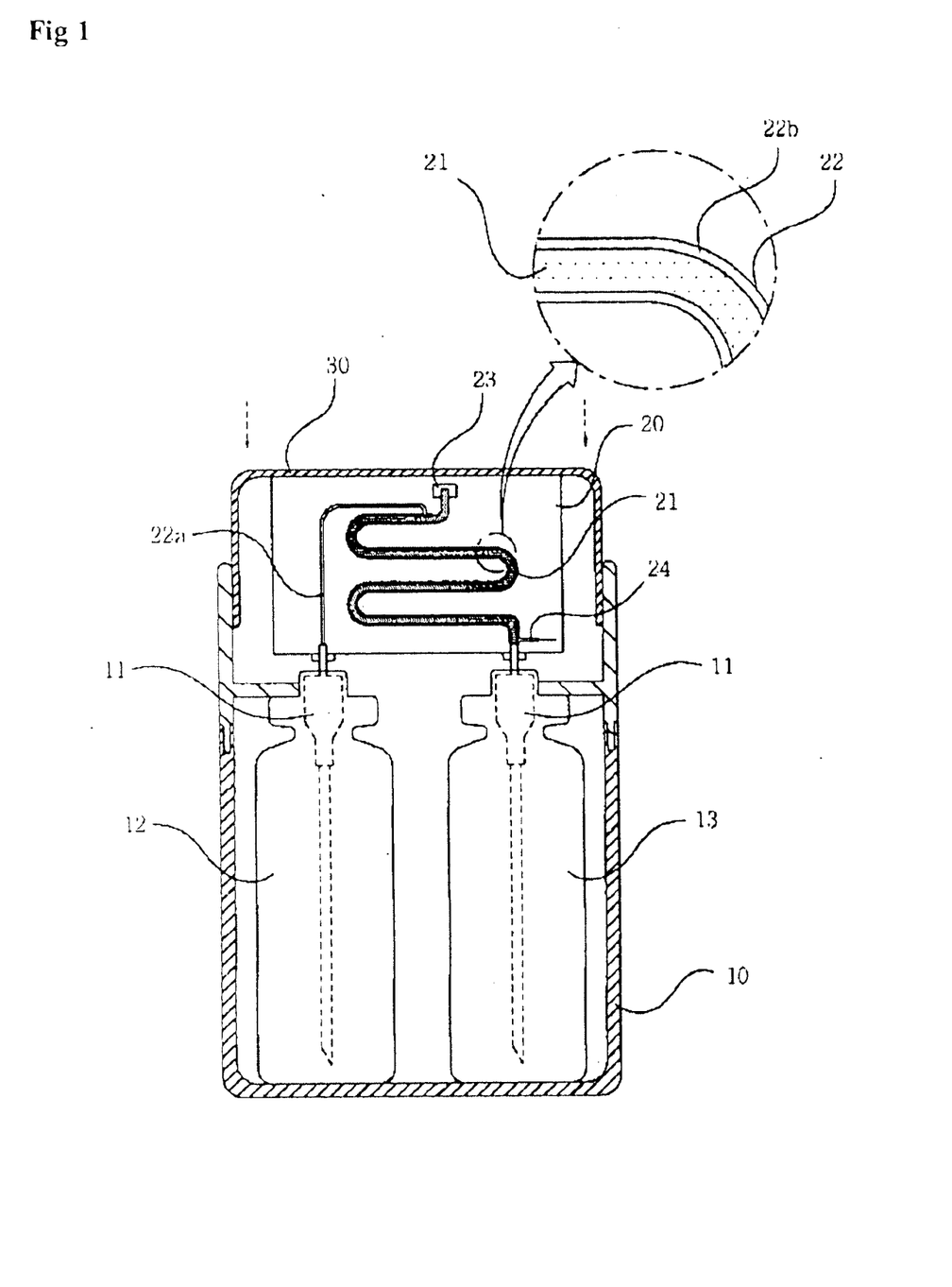
FIG. 1 is a sectional view showing the structure and driving mechanism according to a preferred embodiment of the present invention.

An exemplary embodiment of a cosmetics container having a cooling device is illustrated in FIG. 1. In FIG. 1, the cooling device 20 has a double pipe form wherein cosmetics and refrigerant flow in the opposite directions to each other.

A container 10 includes a cosmetics case 11 and a refrigerant case 12 embedded therein side by side. When a user presses a cap 30, metering valves 13 located on the upper ends of the cosmetics case 11 and the refrigerant case 12 are compressed by a supporting rod 24, and then, the cosmetics and refrigerant of predetermined amounts flow from the cases 11 and 12 to the cooling device 20 and perform heat exchange to each other. After that, the cosmetics are discharged out through a cosmetics outlet 23, and the refrigerant is discharged out through a refrigerant outlet 24.

A flow of fluid inside the cooling device 20 will be described in more detail. The cosmetics flow in a cooling tube 21 made of a metallic material, and the refrigerant flows between the outer wall of the cooling tube 21 and the inner wall of a refrigerant tube 22 made of a synthetic resin material. At this time, as the synthetic resin material is generally heat-insulated due to a very low heat transfer coefficient, the heat exchange is performed only through the cooling tube 21 of the metallic material. The refrigerant advances while being evaporated due to heat absorption from the cosmetics, and the cosmetics advance while being cooled due to heat emission.

However, the double tube type cooling device has an advantage in that it can secure a wide heat transfer area within a small space because it is easy in manufacture and can take a complicated form such as a spiral type as being manufactured in such a manner that a metallic tube is inserted into a synthetic resin tube. On the other hand, such cooling device has a disadvantage in that flow of refrigerant may be not smooth as the cooling tube and the synthetic resin tube are necessarily in contact with each other at bended portions thereof.

Figure 2:
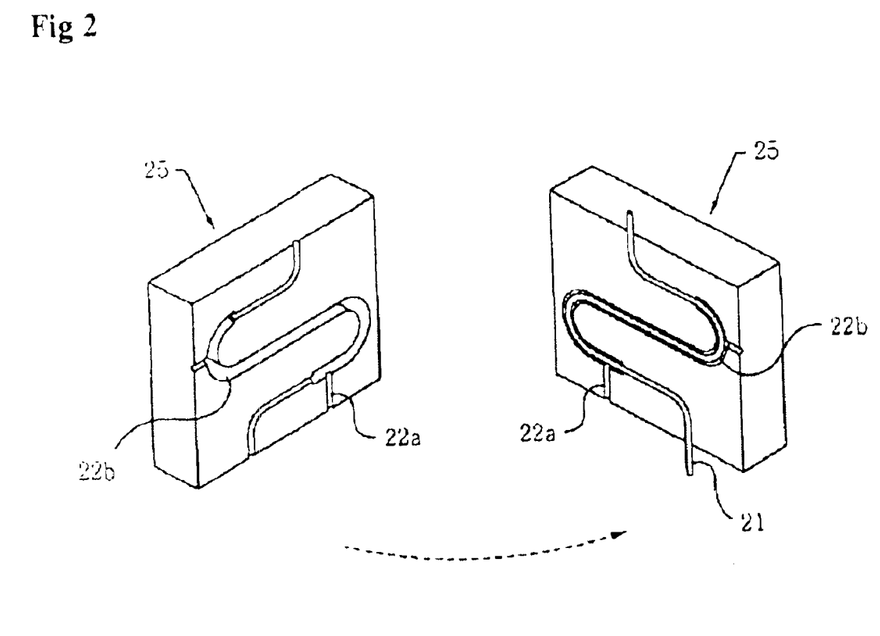
FIG. 2 is an exploded perspective view of a cooling device having different structure from FIG. 1.

As shown in FIG. 2, the cooling device can be manufactured in such a manner that a refrigerant channel 22a and the cooling tube 21 are inserted between grooves 22b, which are formed symmetrically to each other in two synthetic resin plates 25 respectively, and the two synthetic resin plates 25 are adhered with each other.

The two synthetic resin plates 25 can be adhered with each other by means of adhesive agent or high frequency. The cooling device manufactured by the above method can provide excellent heat cutoff efficiency, thereby cooling the cosmetics more effectively.

FIGS. 3a to 4c show a mechanism where the refrigerant and the cosmetics of predetermined amounts are discharged out by a pressing action.

Figure 3A:
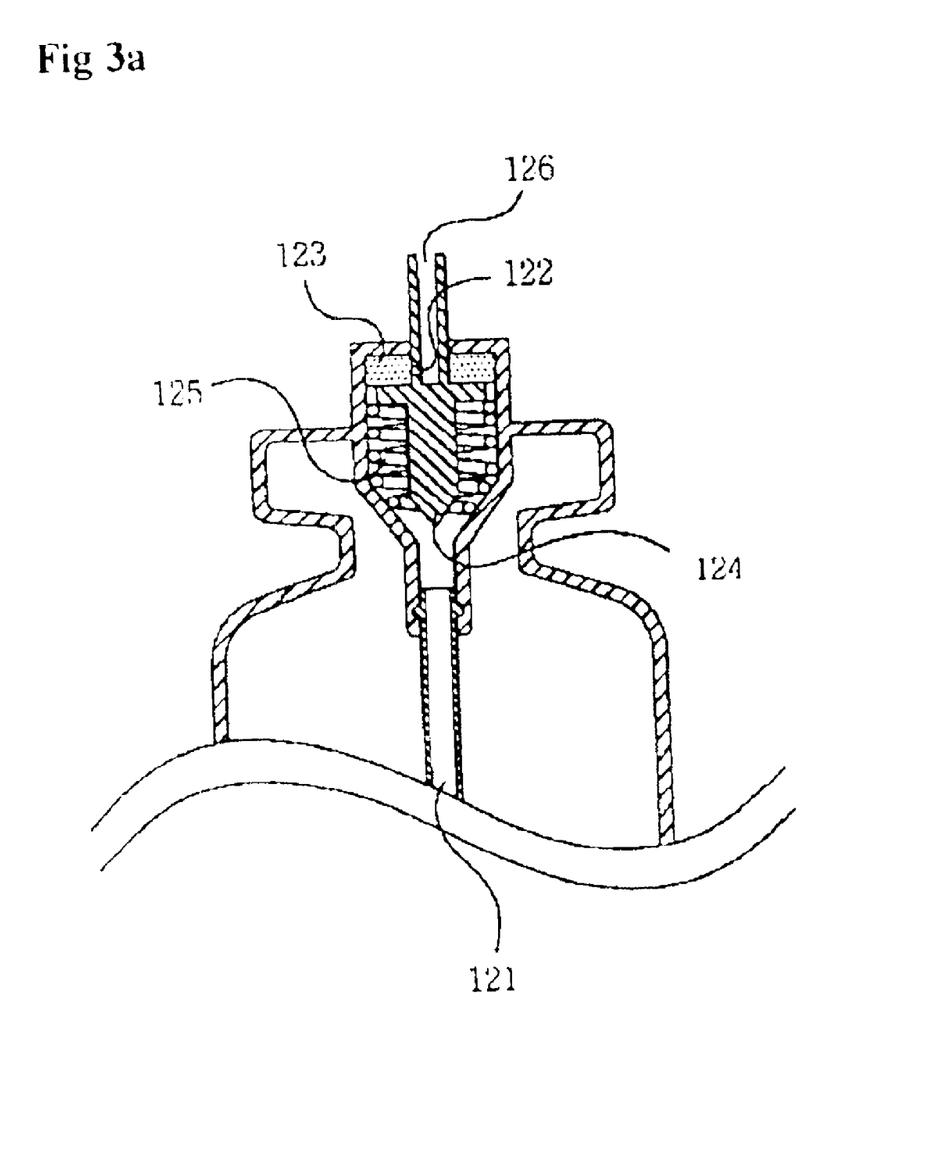
FIGS. 3a to 3c are views of refrigerant discharge part for explaining the mechanism where refrigerant of a predetermined amount is discharged by a pressing action.
Figure 3B:
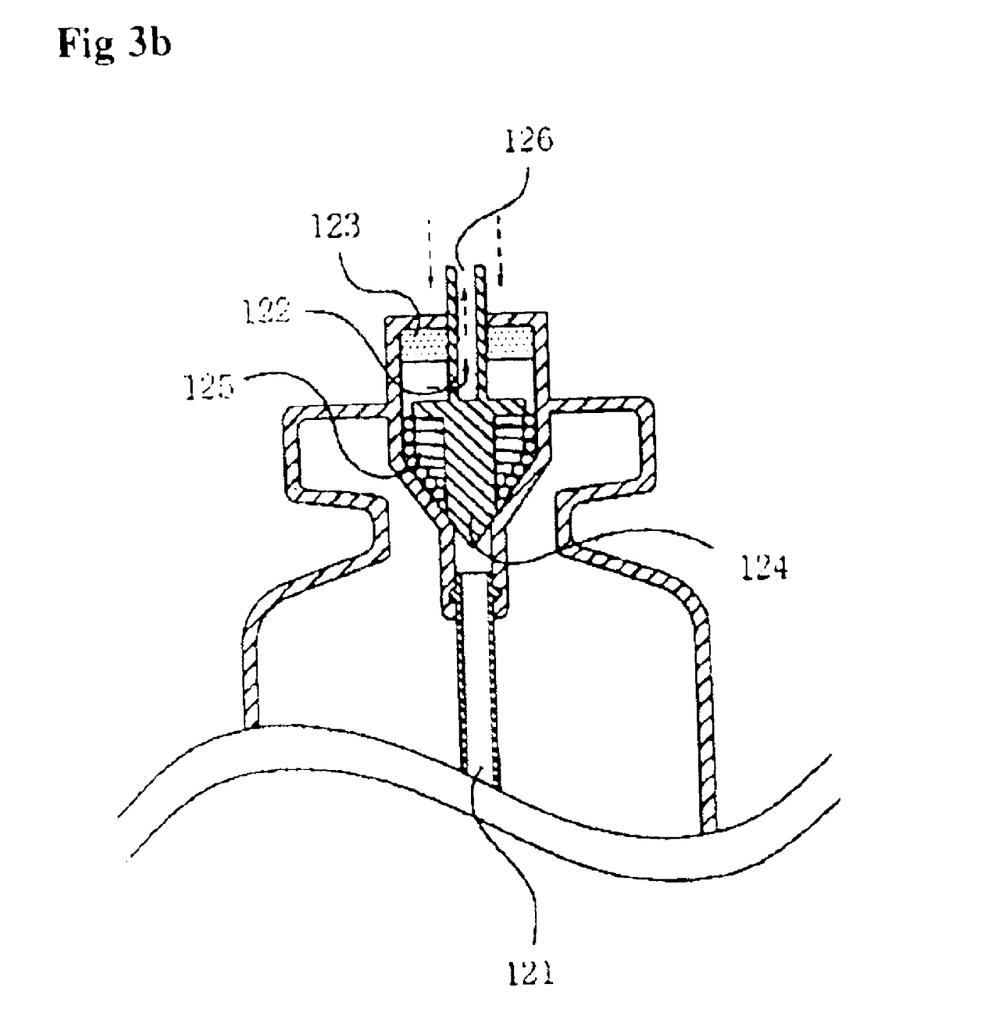
Figure 3C:
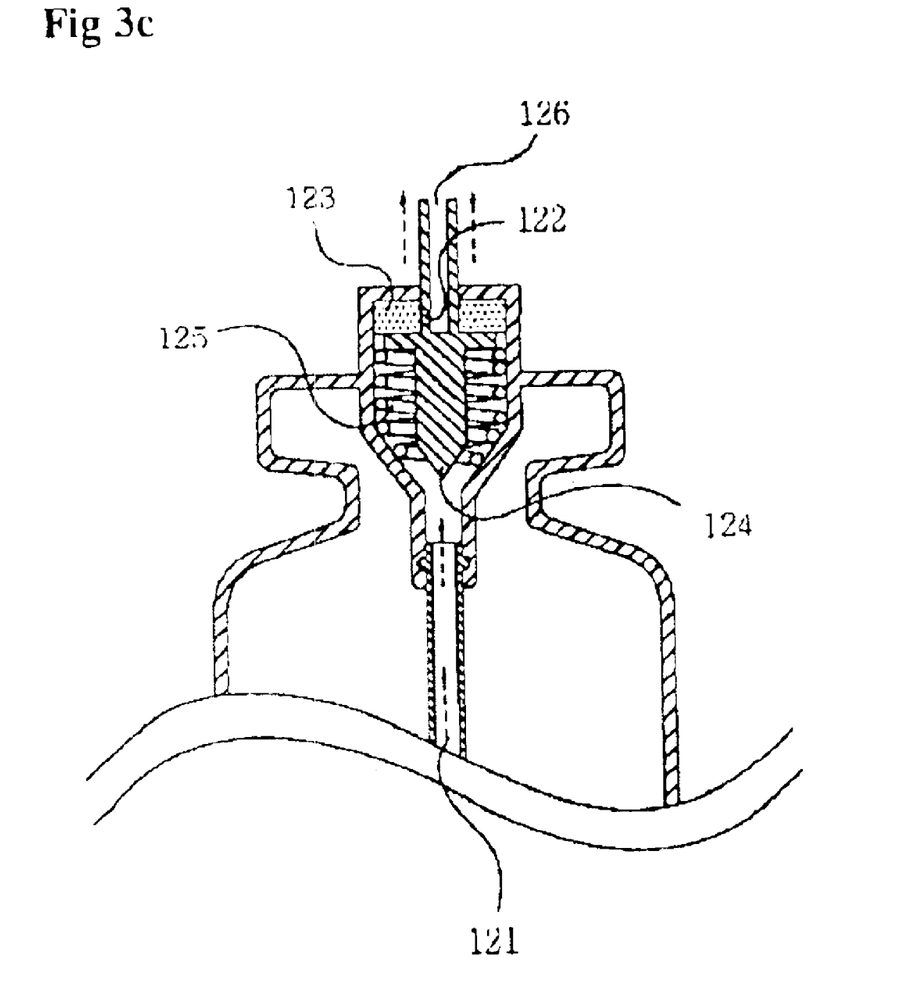

First, referring to FIGS. 3a to 3c, the principle for discharging the refrigerant of the predetermined amount will be described. In FIG. 3, a refrigerant induction tube 121 is opened toward the inside of the refrigerant case 12, and a refrigerant spurt hole 122 is closed by a rubber member 123. In the above condition, when the user presses the cap, a spring 125 is compressed until a rod 124 stops the refrigerant induction tube 121, and thereby, the refrigerant induction tube 121 is closed, and the refrigerant spurt hole 122 is opened, so that the refrigerant is discharged through a refrigerant discharge tube 126 (see FIG. 3b). When the user releases the cap, the spring 125 is returned into the initial position, so that a refrigerant valve cylinder is filled with the refrigerant (see FIG. 3c).

Figure 4A:
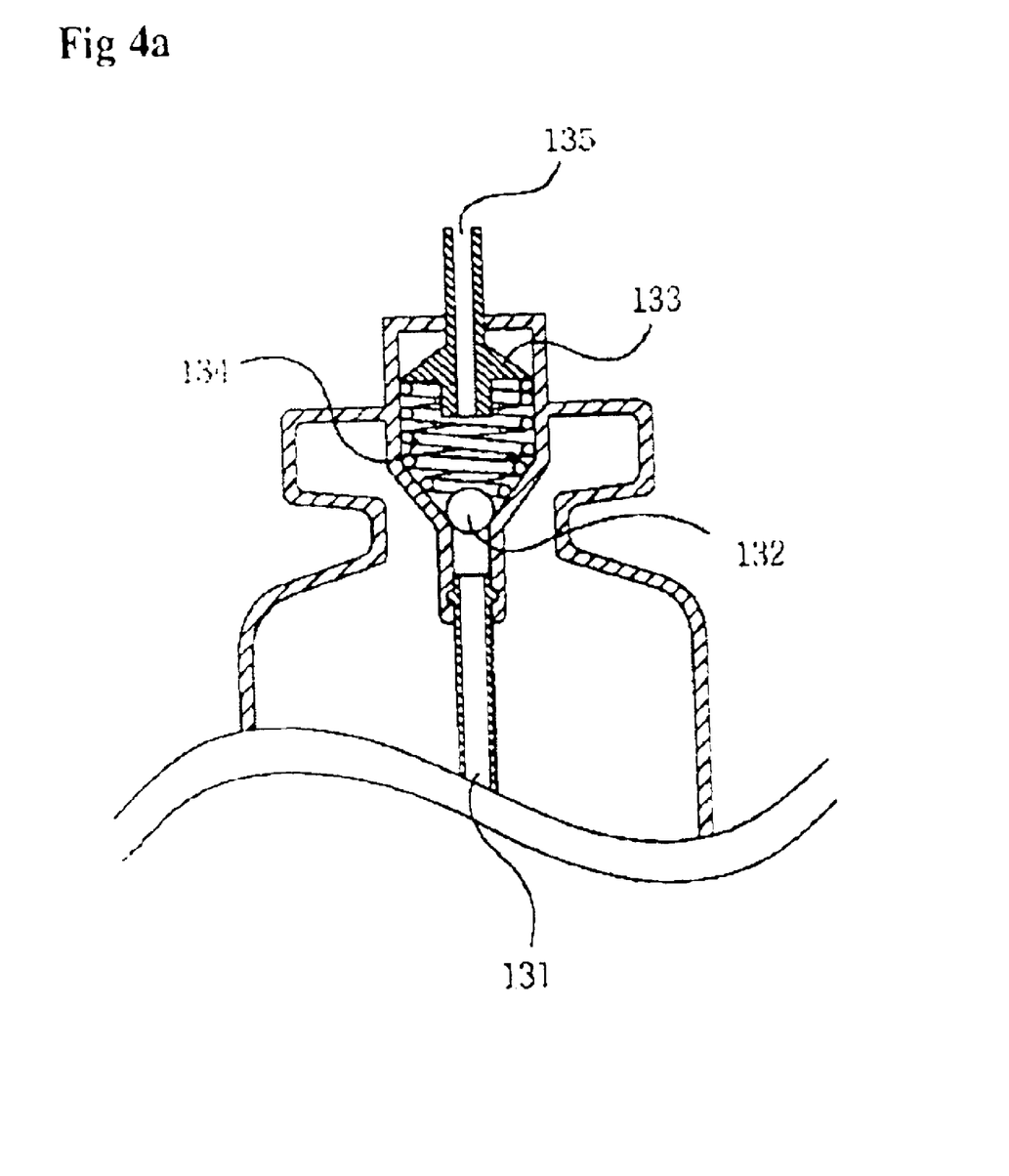
FIGS. 4a to 4c are views of cosmetics discharge part for explaining the mechanism where cosmetics of a predetermined amount are discharged by the pressing action.
Figure 4B:
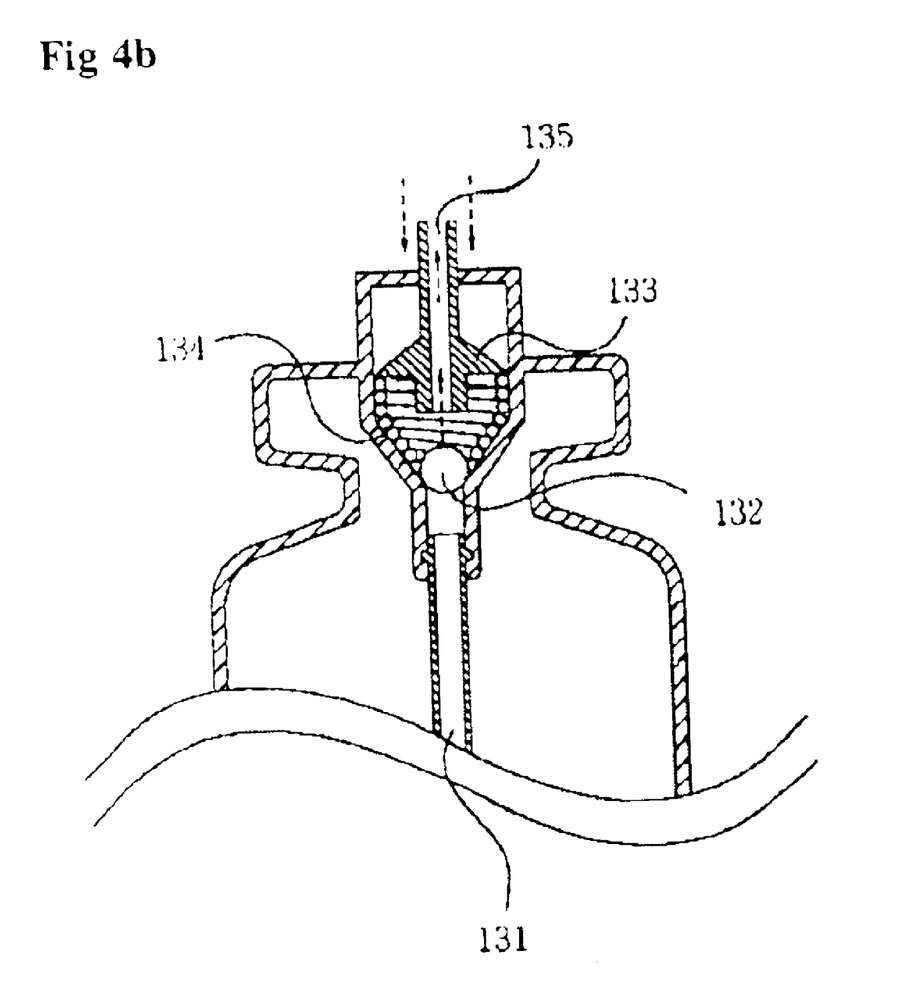
Figure 4C:
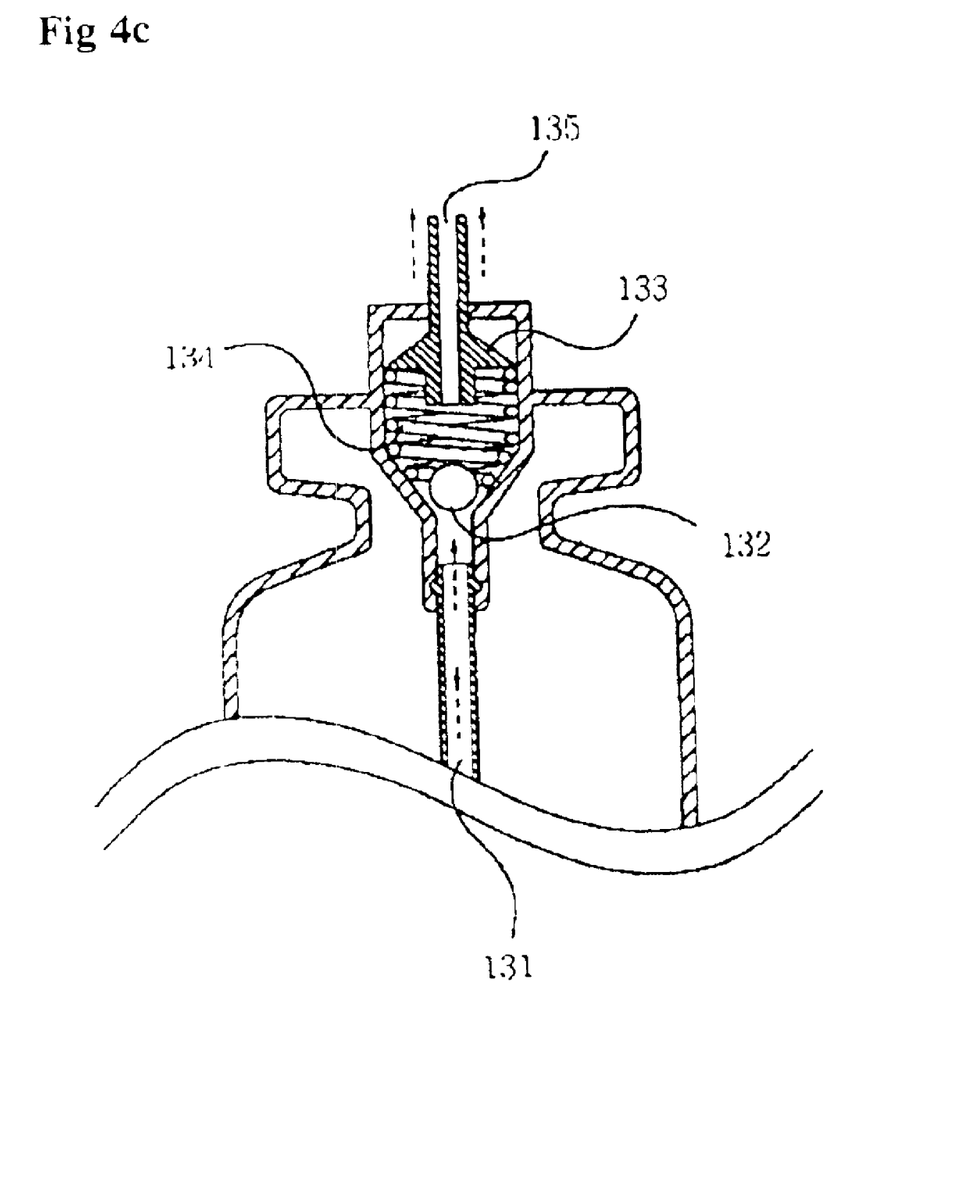

FIGS. 4a to 4c show a conventional cosmetics valve cylinder. In FIGS. 4a to 4c, the cosmetics valve cylinder is filled with the cosmetics, and a ball 132 stops a cosmetics induction tube 131 (see FIG. 4a). In the above condition, when the user presses the cap, that is, lowers a piston 133, the cosmetics are discharged out through a cosmetics discharge tube 135 while a spring 134 is compressed (see FIG. 4b). On the other hand, when the user releases the cap, the spring 134 is returned into the initial position and the inside pressure of the cosmetics valve cylinder is lowered, so that the cosmetics valve cylinder is filled with the cosmetics again (see FIG. 4c) and returned into the initial condition while the ball 132 is lifted up.

If the refrigerant has a high evaporation latent heat and is not harmful to human bodies, any refrigerant can be used, and it is more preferable that refrigerant, which does not require a special high pressure container as having vapor pressure not so high in room temperature, is used. For such refrigerant, there are butane and HFC, but carbon dioxide is not practical as requiring the high pressure container.

Embodiment

A test was made using the cooling device having the structure of FIG. 4. The cosmetics cooling tube was 2 mm in the inner diameter, 70 mm in length, and about 0.22 cc in the internal volume. The refrigerant channel had the diameter of 1 mm at a portion where the cooling tube was not inserted, and the diameter of 3 mm at a portion where the cooling tube was inserted, and an interval between the cooling tube and the inner wall of the refrigerant channel was about 0.2 mm.

For your reference, an amount of HFC134a for cooling water of 0.25 cc from 20° C. to 5° C. was theoretically about 0.15 g.

As described above, the cosmetics container having the cooling device according to the present invention can discharge the cooled cosmetics as much as once needed amount only by simply pressing the cap. Furthermore, the cosmetics container according to the present invention can solve a problem in that water drops are formed on the surface of the container when the user uses the cosmetics container, and be used everywhere.

What is claimed is:

1. A cosmetics container having a cooling device comprising:

a cosmetics case;

a refrigerant case;

a container for containing the cosmetics case and the refrigerant case;

a cosmetics cooling device having a cosmetics cooling tube for cooling cosmetics discharged from the cosmetics case flowing therein and a refrigerant channel for cooling and discharging out the cosmetics contained in the cosmetics cooling tube by evaporating refrigerant discharged from the refrigerant case while the refrigerant flows to a portion of the cosmetics cooling tube and surrounds the cosmetics cooling tube, the cosmetics cooling tube being made of a metallic material and located in the cosmetics cooling device; and a cap containing the cosmetics cooling device therein and having a cosmetics outlet for discharging out the cooled cosmetics, the cap being moved vertically for discharging out the cosmetics and the refrigerant by a pressing action, wherein when a user presses the cap, the refrigerant and the cosmetics of predetermined amounts are simultaneously flown from the cases to the cosmetics cooling device, the refrigerant is evaporated while surrounding and flowing around the outer surface of the cooling tube and cooling the cosmetics, which flows inside the cooling tube, and discharged to a refrigerant outlet, and the cosmetics are cooled while flowing inside the cooling tube and discharged to the cosmetics outlet.

2. The cosmetics container having the cooling device according to claim 1, wherein the refrigerant flows in the opposite direction to the cosmetics.

3. The cosmetics container having the cooling device according to claim 1 or 2, wherein the cosmetics cooling device is in a double tube form where a tube made of a synthetic resin material surrounds the cooling tube of the metallic material.

4. The cosmetics container having the cooling device according to claim 1 or 2, wherein the cooling device is manufactured in such a manner that the refrigerant channel and the cooling tube are inserted between grooves, which are formed symmetrically to each other in two synthetic resin plates respectively, and the two synthetic resin plates are adhered with each other.

* * * * *